United States Patent
Rae et al.

(10) Patent No.: US 11,983,617 B2
(45) Date of Patent: May 14, 2024

(54) SCALABLE AND COMPRESSIVE NEURAL NETWORK DATA STORAGE SYSTEM

(71) Applicant: DeepMind Technologies Limited, London (GB)

(72) Inventors: Jack William Rae, London (GB); Timothy Paul Lillicrap, London (GB); Sergey Bartunov, London (GB)

(73) Assignee: DeepMind Technologies Limited, London (GB)

( * ) Notice: Subject to any disclaimer, the term of this patent is extended or adjusted under 35 U.S.C. 154(b) by 779 days.

(21) Appl. No.: 17/102,318

(22) Filed: Nov. 23, 2020

(65) Prior Publication Data

US 2021/0150314 A1     May 20, 2021

Related U.S. Application Data

(63) Continuation of application No. 16/586,102, filed on Sep. 27, 2019, now Pat. No. 10,846,588.

(Continued)

(51) Int. Cl.
*G06N 3/045* (2023.01)
*G06F 16/22* (2019.01)
*G06N 3/08* (2023.01)

(52) U.S. Cl.
CPC ......... *G06N 3/045* (2023.01); *G06F 16/2272* (2019.01); *G06N 3/08* (2013.01)

(58) Field of Classification Search
CPC ....... G06N 3/08; G06N 3/045; G06N 16/2272
See application file for complete search history.

(56) References Cited

U.S. PATENT DOCUMENTS

| 5,303,330 | A | 4/1994 | Gersho |
| 6,341,281 | B1 * | 1/2002 | MacNicol ......... G06F 16/24535 |

(Continued)

FOREIGN PATENT DOCUMENTS

| CN | 102609446 | B | * | 12/2013 |
| CN | 108431832 | | | 8/2018 |

OTHER PUBLICATIONS

The blog at the bottom of the sea, "Estimating Set Membership With a Bloom Filter", published on Feb. 8, 2015 to https://blog.demofox.org/2015/02/08/estimating-set-membership-with-a-bloom-filter, retrieved Nov. 16, 2023. (Year: 2015).*

(Continued)

*Primary Examiner* — Shourjo Dasgupta
(74) *Attorney, Agent, or Firm* — Fish & Richardson P.C.

(57) ABSTRACT

A system for compressed data storage using a neural network. The system comprises a memory comprising a plurality of memory locations configured to store data; a query neural network configured to process a representation of an input data item to generate a query; an immutable key data store comprising key data for indexing the plurality of memory locations; an addressing system configured to process the key data and the query to generate a weighting associated with the plurality of memory locations; a memory read system configured to generate output memory data from the memory based upon the generated weighting associated with the plurality of memory locations and the data stored at the plurality of memory locations; and a memory write system configured to write received write data to the memory based upon the generated weighting associated with the plurality of memory locations.

23 Claims, 4 Drawing Sheets

Related U.S. Application Data

(60) Provisional application No. 62/737,840, filed on Sep. 27, 2018.

(56) References Cited

U.S. PATENT DOCUMENTS

| | | | |
|---|---|---|---|
| 8,428,916 | B2 | 4/2013 | Koller |
| 10,311,058 | B1 | 6/2019 | Kumar |
| 10,346,727 | B2 | 7/2019 | Lin |
| 10,395,169 | B1 | 8/2019 | Kumar |
| 10,452,526 | B2 | 10/2019 | Rajpal |
| 10,496,885 | B2 | 12/2019 | Hussein |
| 10,664,725 | B2 | 5/2020 | Riedmiller |
| 10,678,786 | B2 | 6/2020 | Zeng |
| 10,678,828 | B2 | 6/2020 | Cramer |
| 10,846,588 | B2 | 11/2020 | Rae et al. |
| 2013/0132352 | A1* | 5/2013 | Kaushik .............. G06F 16/2453 707/693 |
| 2017/0329552 | A1 | 11/2017 | Baldwin |
| 2018/0314627 | A1 | 11/2018 | Orme |
| 2019/0147298 | A1 | 5/2019 | Rabinovich |
| 2019/0251423 | A1 | 8/2019 | Shazeer |
| 2019/0354859 | A1 | 11/2019 | Xu |
| 2019/0362154 | A1 | 11/2019 | Moore |
| 2019/0378008 | A1 | 12/2019 | Markram |
| 2020/0104677 | A1 | 4/2020 | Rae et al. |

OTHER PUBLICATIONS

Jing Chi, "Application and Research on Weighted Bloom Filter and Bloom Filter in Web Cache", published in IEEE Xplore on Sep. 4, 2009, retrieved Nov. 16, 2023. (Year: 2009).*

Jing Chi etc., "Research and Application on Bloom Filter in Routing Planning for Indoor Robot Navigation System", published or made available via the 2009 Pacific-Asia Conference on Circuits, Communications and System, retrieved Nov. 16, 2023. (Year: 2009).*

Yanqing Peng etc., "Persistent Bloom Filter: Membership Testing for the Entire History", made available at SIGMOD'18 in Houston TX USA on Jun. 10-Jun. 15, 2018, retrieved Nov. 16, 2023. (Year: 2018).*

Zalan Heszberger etc., "Adaptive Bloom Filters for Multicast Addressing", presented via High-Speed Networks 2011 Workshop at IEEE Infocom 2011, retrieved Nov. 16, 2023. (Year: 2011).*

Arora et al., "Do GANs actually learn the distribution? An empirical study," arXiv, Jul. 2017, 11 pages.

Chen et al., "Pixelsnail: An improved autoregressive generative model," arXiv, Dec. 2017, 6 pages.

Dinh et al., "Density estimation using Real NVP," https://arxiv.org/abs/1605.08803v1, May 2016, 29 pages.

Jouppi et al., "In-datacenter performance analysis of a tensor processing unit," arXiv, Apr. 2017, 17 pages.

Kalchbrenner et al., "Efficient neural audio synthesis," arXiv, Jun. 2018, 10 pages.

Kalchbrenner et al., "Video pixel networks," arXiv, Oct. 2016, 16 pages.

Karras et al., "Progressive growing of gans for improved quality, stability, and variation," arXiv, Feb. 2018, 26 pages.

Kingma et al., "Glow: Generative flow with invertible 1x1 convolutions," arXiv, Jul. 2018, 15 pages.

Kolesnikov et al., "Deep probabilistic modeling of natural images using a pyramid decomposition," Semantic Scholar, Dec. 2016, 9 pages.

Kraska et al., "The Case for Learned Index Structures," https://arxiv.org/abs/1712.01208v1, Dec. 2017, 27 pages.

Mescheder et al., "Which Training Methods for GANs do actually Converge?" arXiv, Jul. 2018, 39 pages.

Mitzenmacher, "Optimizing Learned Bloom Filters by Sandwiching," https://arxiv.org/abs/1803.01474, Mar. 2018, 3 pages.

Oord et al., "Conditional image generation with pixelcnn decoders," arXiv, Jun. 2016, 13 pages.

Oord et al., "Wavenet: A generative model for raw audio," arXiv, Sep. 2016, 15 pages.

Parmar et al., "Image transformer," arXiv, Jun. 2018, 10 pages.

PCT International Search Report and Written Opinion in International Appln. No. PCT/EP2019/076143, mailed on Jan. 8, 2020, 19 pages.

Rae et al., "Meta-Learning Neural Bloom Filters," https://arxiv.org/abs/1906.04304, Jun. 2019, 14 pages.

Rae et al., "Scaling Memory-Augmented Neural Networks with Sparse Reads and Writes," https://arxiv.org/abs/1610.09027, Oct. 2016, 17 pages.

Reed et al., "Parallel multiscale autoregressive density estimation," arXiv, Mar. 2017, 16 pages.

Santoro et al., "Meta-Learning with Memory-Augmented Neural Networks," Proceedings of The 33rd International Conference on Machine Learning, Jun. 2016, 48:1842-1850.

Vaswani et al., "Attention is all you need," arXiv, Dec. 2017, 15 pages.

Vaswani et al., "Tensor2tensor for neural machine translation," arXiv, Mar. 2018, 9 pages.

Vinyals et al., "Matching Networks for One Shot Learning," https://arxiv.org/abs/1606.04080, last revised Dec. 2017, 12 pages.

Wu et al., "Google's neural machine translation system: Bridging the gap between human and machine translation," arXiv, Oct. 2016, 23 pages.

PCT International Preliminary Report on Patentability in International Appln. No. PCT/EP2019/076143, mailed on Apr. 8, 2021, 13 pages.

Office Action in European Appln. No. 19782527.6, dated Oct. 17, 2023, 11 pages.

Office Action in Chinese Appln. No. 201980063938.9, dated Jan. 5, 2024, 17 pages (with English translation).

* cited by examiner

SCALABLE AND COMPRESSIVE NEURAL NETWORK DATA STORAGE SYSTEM

CROSS-REFERENCE TO RELATED APPLICATIONS

This is a continuation of U.S. application Ser. No. 16/586,102, filed on Sep. 27, 2019, which claims priority to U.S. Provisional Application No. 62/737,840, filed on Sep. 27, 2018. The disclosures of the prior applications are considered part of and are incorporated by reference in the disclosure of this application.

BACKGROUND

This specification relates to a system for compressed data storage using a neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that provides a system for storing compressed data using a neural network. The system is able to encode and store data in a sparse and distributed manner in a memory to implement a learned data structure appropriate for one or more tasks. The learned data structure is highly compressive and reduces memory requirements greatly.

According to a first aspect, there is provided a system for storing compressed data using a neural network comprising: a memory comprising a plurality of memory locations configured to store data; a query neural network configured to process a representation of an input data item to generate a query; an immutable key data store comprising key data for indexing the plurality of memory locations; an addressing system configured to process the key data and the query to generate a weighting associated with the plurality of memory locations; a memory read system configured to generate output memory data from the memory based upon the generated weighting associated with the plurality of memory locations and the data stored at the plurality of memory locations; and a memory write system configured to write received write data to the memory based upon the generated weighting associated with the plurality of memory locations.

The key data store is immutable in the sense that the key data once created is fixed and does not change over time or in use. In addition, whilst the other components of the neural network system may be learned through training, the key data is not learned.

The key data store may comprise a plurality of randomly generated keys for indexing the plurality of memory locations, wherein the plurality of keys are immutable after generation.

Alternatively, the key data store may comprise immutable seed data for generating a plurality of immutable keys for indexing the plurality of memory locations; and the addressing system may be further configured to generate the plurality of keys based upon the seed data. By storing the seed data and generating the plurality of keys on demand rather than storing the full set of keys, memory requirements may be reduced.

It will be appreciated that using the same seed data will result in the generation of the same keys at all times. It will also be appreciated that a single seed may be used to generate a plurality of keys in addition to the possibility of one single key. For example, the seed may be used to generate a key to which an additional offset value is added to generate further keys. In another example, further keys may be generated by running a generation algorithm for multiple time steps with each time step producing a key.

The plurality of generated keys may be based upon a sample of Gaussian random variables. Where seed data is stored, the seed data comprises one or more seeds for generating the sample of Gaussian random variables. By using randomly generated keys, data may be stored at memory locations distributed throughout the memory, thereby increasing memory utilization.

The key data store may be implemented as a matrix. The keys may alternatively be known as addresses and the key data store may be known as an addressing matrix.

The addressing system may be further configured to process the key data and the query to generate a weighting associated with the plurality of memory locations based upon a similarity between the query and each of the plurality of keys. The similarity may be based upon any similarity metric such as a cosine distance or a Euclidean distance.

The system may further comprise an index of the plurality of keys based upon a k-nearest neighbor model. The similarity between the query and each of the plurality of keys may be further based upon the k-nearest neighbor model. For example, the k-nearest neighbor model may be based upon locality-sensitive hashing. In this way, the most similar keys to a query may be quickly determined. Given that the key data store is immutable, the k-nearest neighbor model need only be indexed once compared to prior art methods where the key data store is not immutable and would require re-generating the key index each time the key data store is modified.

The query neural network may be a feed-forward neural network.

The addressing system may be further configured to decorrelate the query. Processing the key data and the query to generate a weighting associated with the plurality of memory locations may be based upon the decorrelated query. In this way, training of the system to learn an appropriate query representation may be made more efficient through faster convergence. Using a decorrelated query encourages system to maximize the usage of all available memory locations for storing data, thereby avoiding selection of only a specific few memory locations for data storage. In addition, a decorrelated query may also result in better optimization during training resulting in a learned data encoding scheme that may be more compressive and hence improves upon memory usage. The decorrelation may be based upon a sphering transformation, for example, a moving average ZCA transformation. A sphering transformation may also be known as a whitening transformation.

The weighting may be based upon a sparse softmax function. That is, the function may be used to select the k-most similar keys and thus, the corresponding memory locations indexed by those keys. By selecting the k-most similar keys and corresponding memory locations, information may be shared between multiple memory locations to increase the informational content of the data stored in memory whilst also maintaining efficient memory utilization. The value of k may be selected as deemed appropriate by a person skilled in the art.

The system may further comprise an encoder neural network configured to process the input data item to generate the representation of the input data item. In this way, the representation may provide more informative features for processing than the raw input data item. The encoder neural network may be a feed-forward neural network or other suitable type of neural network for processing a particular type of input data item.

The memory read system may be further configured to generate the output memory data based upon applying the corresponding weighting associated with a memory location to the data stored at the memory location. The application of the weighting may be an element-wise multiplication. Thus, the memory read system may be a content-based soft-attention system.

The memory read system may be further configured to generate output memory data based upon the data stored at the memory locations having associated weightings greater than a threshold and to exclude data stored at other memory locations in the generation of the output memory data. The threshold may be chosen such that the k memory locations having the highest weightings are selected. The value of k may be selected as deemed appropriate by a person skilled in the art.

The system may further comprise a write word neural network configured to process the representation of the input data item to generate the received write data. In this way, the data to be written to memory may also be learned. The write word neural network may be a feed-forward neural network.

The memory write system may be further configured to generate weighted write data for each memory location based upon the corresponding weighting associated with the memory location and the received write data; and to additively write the weighted write data to each memory location. By additively writing, past data stored in the memory may be maintained. In addition, backpropagation through time over sequential writes may also be avoided. Temporal correlations may also be stored in the memory.

The system may also comprise an output representation neural network configured to process the output memory data of the memory read system, the received write data and the representation of the input data item to generate an output representation of the input data item. This enables non-linear interactions between data stored in the memory to be captured. In addition, an input data item may be modelled in part by the data stored in the memory. As the data stored in the memory may be rapidly adapted as compared to the parameters of a neural network which change slowly over time, the use an external memory as described above can enable the system to generalize where only a limited number of examples of a set of data items have been presented or where the environment or tasks are expected to change over time. Data items which belong to the same class or set may be mapped to the same memory locations thus enabling generalization of unseen data items. The output representation neural network may be a feed-forward neural network.

The system may be trained based upon a meta-learning framework. For example, the system may be trained based upon a series of tasks having a limited number of training examples in each task. The series of tasks may be sampled from a common distribution. The training dataset may comprise data that is to be stored in the memory and a set of in-distribution queries and a set of queries outside of the distribution that are representative of the data and queries that the system will likely encounter during use. It will be appreciated that the neural network system is fully differentiable and may be trained end-to-end. The system may be trained based upon a cross-entropy loss. The training targets may comprise binary classifications. The system may be trained using backpropagation jointly through a querying operation and a memory insertion operation.

The data stored in the memory may comprise data indicative of one or more sets of data. The output memory data of the memory read system may be indicative of whether the input data item belongs to a set of the one or more sets of data. For example, the system may implement a data structure similar to a bloom filter that enables the system to rapidly determine whether an input data item belongs to a particular set of data. The neural network system may be trained to function as a bloom filter and act as a replacement for a bloom filter in an existing system. The system however has the capability of learning a more compressive and space-efficient data structure than a bloom filter for a task such as approximate set membership. The system is suitable for both static and dynamic set membership tasks. In some prior art neural network systems, set data is encoded in the weights of the neural network system and is therefore not suitable for dynamic set membership tasks given the slow adaptation rate of the weights of a neural network. In the present system, the memory of the system, which is capable of rapid adaptation, is used for encoding set data and is therefore suitable for dynamic set membership tasks.

The system may further comprise a back-up bloom filter for handling false negative results.

According to a further aspect, there is provided a system for storing compressed data using a neural network comprising: a memory comprising a plurality of memory locations configured to store data; a query neural network configured to process a representation of an input data item to generate a query; an immutable key data store comprising key data for indexing the plurality of memory locations; an addressing system configured to process the key data and the query to generate a weighting associated with the plurality of memory locations; a memory access system configured to access memory data from the memory based upon the generated weighting associated with the plurality of memory locations.

According to another aspect, there is provided a method of reading data from a system for storing compressed data using a neural network comprising: receiving a representation of an input data item; processing, by a query neural network, the representation of the input data item to generate a query; retrieving, from an immutable key data store, key data for indexing a plurality of memory locations of a memory; processing, by an addressing system, the query and the key data to generate a weighting associated with the plurality of memory locations; and outputting, by a memory read system, output memory data from memory based upon the generated weighting associated with the plurality of memory locations and the data stored at the plurality of memory locations.

According to another aspect, there is provided a method of writing data to system for storing compressed data using a neural network, comprising: receiving a representation of an input data item; processing, by a query neural network, the representation of the input data item to generate a query; retrieving, from an immutable key data store, key data for indexing a plurality of memory locations of a memory; processing, by an addressing system, the query and the key data to generate a weighting associated with the plurality of memory locations; receiving write data; and writing, by a memory write system, the received write data to the memory based upon the generated weighting associated with the plurality of memory locations.

According to another aspect, there is provided a non-transitory computer readable medium comprising computer readable instructions that when executed causes one or more computers to implement a system according to any aspect above or to perform a method according to any aspect above.

The system may be configured to receive any kind of digital data input. For example the stored data and/or input data items may comprise images (including video images), images or features that have been extracted from images; characters, words or strings, a sequence or piece of text in one or more languages e.g., text in one language and a translation of the text into another language; Internet resources (e.g., web pages), documents, or portions of documents or features extracted from Internet resources, documents, or portions of documents, content items; impression contexts for particular advertisements; features of a personalized recommendation for a user and/or features characterizing the context for the recommendation, e.g., features characterizing previous actions taken by the user; a data sequence representing a spoken utterance and/or transcript for the utterance; scores for any of the foregoing; or any other kind of data item which may be stored in a database. Generally the memory of the system may be used to store any type of data, including but not limited to the foregoing.

The subject matter described in this specification can be implemented in particular embodiments so as to realize one or more of the following advantages, the system is capable of learning a data structure appropriate to a particular task or tasks. Given that the system provides rapid adaption to new information, the system is particularly advantageous where data items can only be inspected a limited number of times, even only once, such as in a data stream. The system is also particularly advantageous in settings where tasks or an environment changes over time. The system is also capable of quickly generalizing to unseen data.

The system can learn how to effectively index and query the data structure based upon the input data, and how to effectively encode and store data in the memory. That is, the system can store information using an encoding based upon either the particular memory locations at which data is stored, or the particular data that is stored at a memory location or a combination of both where data is stored and what data is stored in the memory. The system provides greater data compression than a classical data agnostic data structure by learning to exploit the structure of the input data. As such, the system may require fewer bits per element to store data than a classical data structure. The system also provides compression across memory locations thereby achieving greater compression than other prior art memory augmented neural networks. The system therefore provides a scalable, distributed compressive write scheme.

In addition, the system is low in latency due to the architecture of the system and the efficient operations used for performing querying, addressing, and memory access.

In addition, by providing a querying mechanism and immutable key data store as described above, the size of the memory of the system may be made independent of the number of trainable parameters of the neural network components and the system may therefore be more scalable than other prior art memory augmented neural networks. Due to the independence of the size of the memory and the number of trainable parameters, the size of the memory may be modified during use even after the neural network components have been trained.

The system may implement a data structure suitable for determining approximate set membership similar to a bloom filter or other type of data structure as appropriate.

For example, the system may be used to rapidly determine whether records exist in a large database to avoid unnecessary disk look-ups, to determine whether a data item exists in a cache, in network security to block malicious IP addresses, as a type of classifier to classify image, video, audio and text data, by an agent to determine whether a particular environment corresponds to an environment previously encountered before and how to act.

It will be appreciated that aspects can be combined and that features described in the context of one aspect can be combined with other aspects of the invention.

It will also be appreciated that components of the system such as the memory, addressing system, memory read system and memory write system may be adapted from existing memory and systems for addressing, reading to and writing from the memory comprised in existing computers. In addition, or alternatively, the components of the system may be configured to be compatible with existing memory and memory access systems and other existing computing components.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
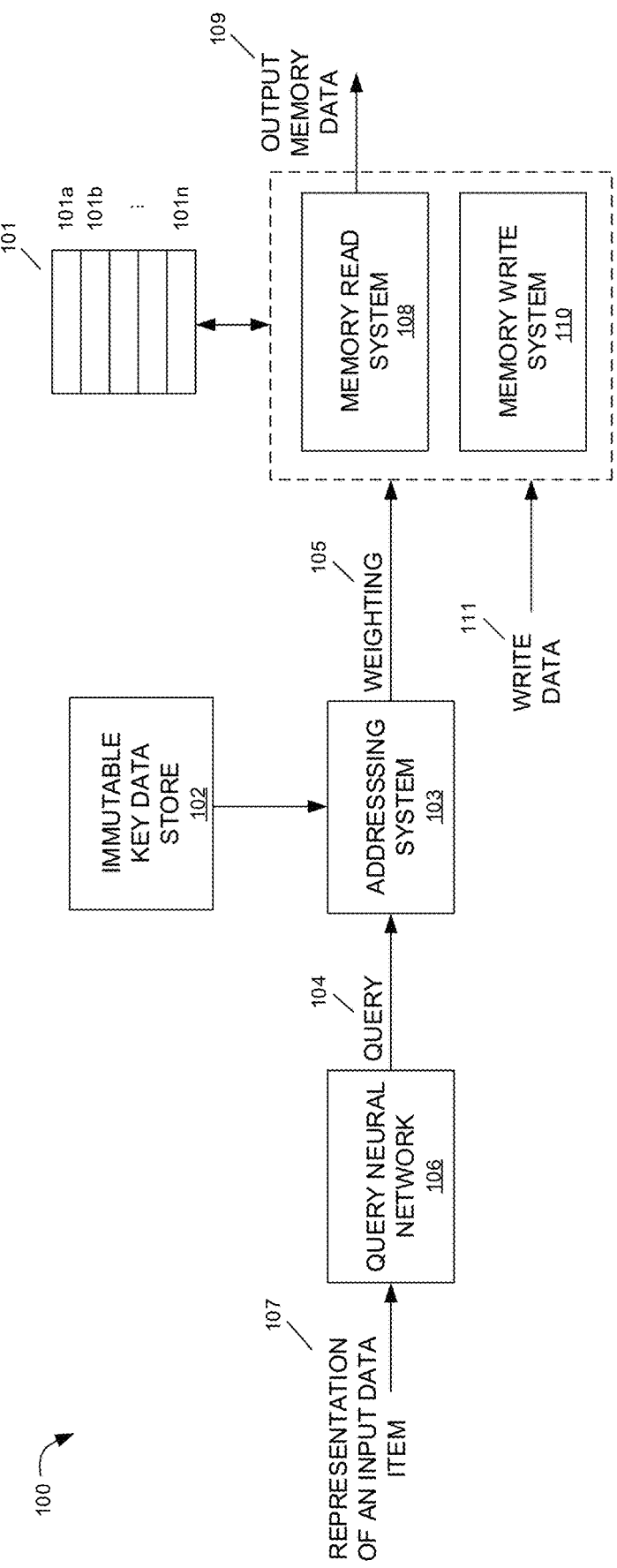
FIG. 1 shows an example system for compressed data storage using a neural network.

FIG. 1 shows an example system 100 for compressed data storage using a neural network. The system 100 is an example of a system implemented as computer programs on one or more computers in one or more locations, in which the systems, components, and techniques described below can be implemented.

The system 100 comprises a memory 101. The memory 101 comprises a plurality of memory locations 101a . . . n configured to store data. The memory 101 may store any type of data as appropriate for a particular task being performed. For example, the system 100 may implement a data structure equivalent to a bloom filter for performing an approximate set membership task. As such, the memory 101 may store data indicative of one or more sets of data. In other examples, the stored data may be image data, an encoding of the image data, or data indicative of a property associated with an image. Other modalities may also be stored such as video or audio data or text data, for example, data may relating to data in a database.

The size of the memory 101 may be chosen as deemed appropriate by a person skilled in the art and be chosen based upon the task being performed. As an example, for the approximate set membership task, the memory may have 2 to 128 memory locations (inclusive) with each memory location storing 2 to 10 elements (inclusive).

As described in further detail below, the system 100 may learn to store data in the memory 101 in a compressed and distributed manner such that memory requirements are greatly reduced as compared to conventional methods of storing the data.

The system 100 further comprises an immutable key data store 102 comprising key data for indexing the plurality of memory locations 101a . . . n. The key data store 102 is immutable in the sense that once the key data has been generated, it cannot be modified. The key data may be mapped to particular memory locations and may therefore be considered to provide an addressing mechanism for reading from and writing to the memory 101. As such, the key data may also be considered to be address data. Further details with respect to the key data are described below.

The system 100 also comprises an addressing system 103 configured to process the key data and a query 104 to generate a weighting 105 associated with the plurality of memory locations 101a . . . n. The weighting 105 may be used in determining which of the plurality of memory locations 101a . . . n to access based upon a given query 104. In this way, the weighting 105 may also be considered to be a form of address for accessing the plurality of memory locations 101a . . . n. Further details with respect to the generation of the weighting 105 are described below.

The system 100 further comprises a query neural network 106 configured to process a representation 107 of an input data item to generate the query 104. The input data item may be any type of data. For example, image data, audio data, sensor data, web data and text. The representation 107 of the input data item may be an encoding or embedding of the input data item. For example, the representation may be a feature vector characterizing the input data item or may be a representation or encoding produced by a neural network.

The system 100 also comprises a memory access system configured to access memory data from the memory 101. The accessing may be based upon the generated weighting 105 associated with the plurality of memory locations 101a . . . n. Thus, the system 100 may comprise a memory read system 108 configured to generate output memory data 109 based upon the generated weighting 105 associated with the plurality of memory locations 101a . . . n and the data stored at the plurality of memory locations 101a . . . n. The system 100 may also comprise a memory write system 110 configured to write received write data 111 to the memory 101 based upon the generated weighting 105 associated with the plurality of memory locations 101a . . . n. As noted above, the weighting 105 may function as a form of address to select which of the plurality of memory locations 101a . . . n to access. The memory access system is described in further detail below and may comprise one or more neural networks.

The system 100 having trainable neural network parameters can not only learn how best to encode and store data in the memory 101 but also how best to address and query the memory 101 for efficient access. As the key data is immutable and not learned, the size of the memory 101 is independent of the number trainable parameters and therefore improves the scalability of the system. The size of the memory may also be dynamically adjusted without the need for re-training the system.

In addition, use of a memory enables rapid adaptation to new data as compared to the parameters of a neural network which can only change slowly over time. The system can therefore generalize where only a limited number of examples of a set of data items have been presented or where the environment or tasks are expected to change over time. Data items which belong to the same class, distribution or set may be mapped to the same memory locations thus enabling generalization to unseen data items.

Figure 2:
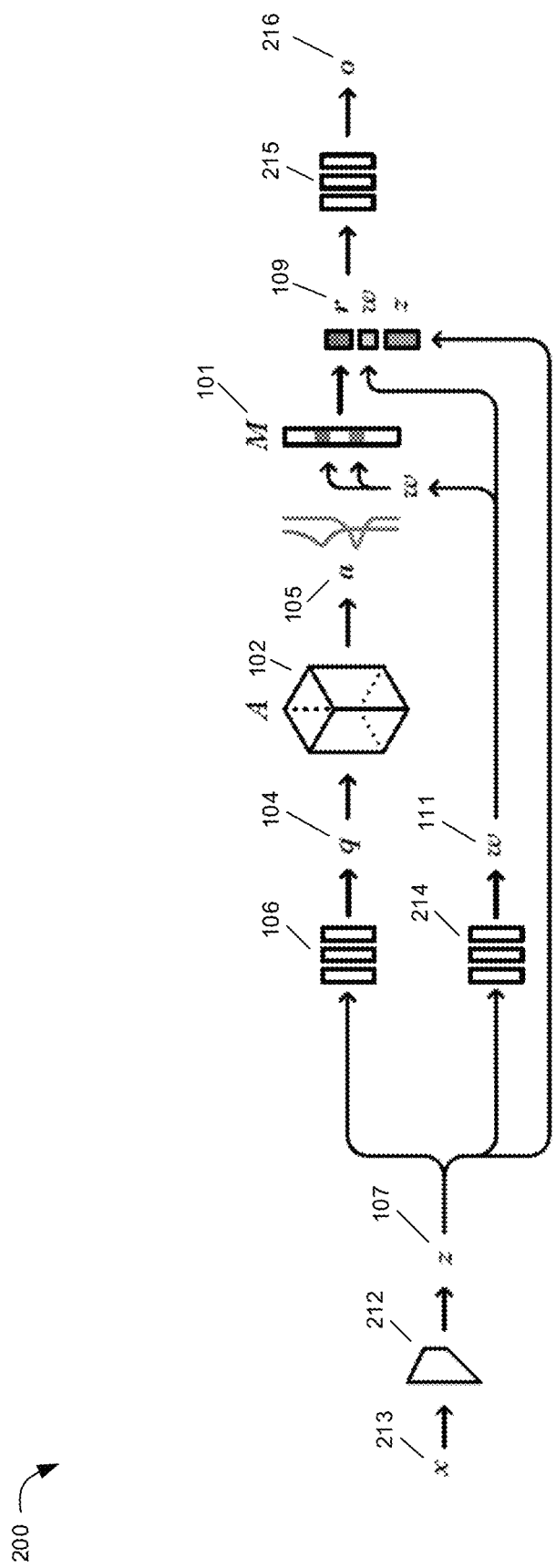
FIG. 2 shows another example system for compress data storage using a neural network.

Referring now to FIG. 2, another example system 200 for compressed data storage using a neural network is shown. The system 200 of FIG. 2 comprises the components of the system 100 of FIG. 1 whereby like components have the like reference numerals in the figures. In this respect, FIG. 2 also includes additional labels in which the memory 101 is labelled as "M"; the immutable key data store 102 is labelled as "A", the query 104 is labelled as "q", the weighting 105 is labelled as "a", the representation 107 of the input data item is labelled as "z", the output memory data 109 is labelled as "r" and the write data 111 is labelled as "w".

The system 200 further comprises an encoder neural network 212 configured to process an input data item 213 to generate the representation 107 of the input data item. The representation 107 may provide more informative features for processing and performing a required task than the raw input data item 213 and such a representation may be learned by training the parameters of the encoder neural network 212. Training of neural network parameters is described in further detail below.

The encoder neural network 212 may be any type of neural network as deemed appropriate by a person skilled in the art. For example, if the input data item is an image, the encoder neural network may be a convolutional neural network or feed-forward mutli-layer perceptron (MLP). If the input data item is a sequence, such as a text sequence, video, audio sequence, the encoder neural network 212 may be a recurrent neural network such as an LSTM. In one example, the encoder neural network 212 is a three layer convolutional neural network configured to process an image input. In another example, the encoder neural network 212 is an LSTM with 128 hidden units configured to process text input such as a database row key.

The system 200 also comprises a write word neural network 214 configured to process the representation 107 of the input data item to generate the received write data 111. In this way, the data to be written to the memory 101 may also be learned. Thus, the system may learn what to write to memory in addition to where to write to memory in order to further provide a distributive and compressive encoding of data for storage.

The write word neural network 214 may be any type of neural network such as a feed-forward MLP. In one example, the write word neural network 214 is an MLP with a single hidden layer of 128 units with a leaky ReLU non-linearity.

The system 200 further comprises an output representation neural network 215 configured to process the output memory data 109 read from the memory 101, the received write data 111 and the representation 107 of the input data item to generate an output representation 216 of the input data item. The output representation 216 of the input data item 213 may be dependent on the task being performed by the system 200. For example, if the task is approximate set membership, the output may be a probability that the input data item belongs to the set of input data items that has previously been seen by the system 200. This may be used in applications such as caching, malicious URL detection, database querying, spell-checking amongst other applications. In another example, the task may be a classification task and the output may be a probability that the input data item, such as an image, belongs to or comprises an object of a particular class. In a further example, the output representation 216 may be a representation of the input data item that is a better encoding of the input data item for use in a separate system, such as a classifier or robotic agent. Thus, an input data item 213 may be modeled in part by the data stored in the memory 101.

The output representation neural network 215 may be any type of neural network. In one example, the output representation neural network 215 is a three layer MLP with residual connections. By using an output representation neural network, non-linear interactions in the data stored in the memory can be captured.

In FIG. 2, the memory read system 108 and the memory write system 110 are not specifically distinguished. It will be appreciated that components involved in reading from the memory 101 may form part of a memory read system 108 and components involved in writing to the memory 101 may form part of a memory write system 110. It will also be appreciated that components may belong to both the memory read system 108 and the memory write system 110.

Further details with respect to the key data will now be described. The key data may comprise a plurality of randomly generated keys for indexing the plurality of memory locations $101a \ldots n$. For example, the plurality of keys may be based upon a sample of Gaussian random variables. Alternatively, a different random number generation process may be used as appropriate. By using randomly generated keys, data may be stored at memory locations distributed throughout the memory, thereby increasing memory utilization.

As discussed above, after generation, the plurality of keys are immutable, that is, the plurality of keys cannot be modified after creation. Where the plurality of keys are generated randomly, the immutable key data store 102 may store the seed data used to generate the plurality of keys rather than the plurality of keys themselves. Therefore, the addressing system 103 may be configured to re-generate the plurality of keys using the immutable seed data. By storing the immutable seed data rather than the plurality of keys, the storage/memory requirements of the immutable key data store 102 may be reduced.

It will be appreciated that using the same seed data input to the same random generation process will result in the generation of the same keys. It will also be appreciated that a single seed may be used to generate a plurality of keys or a single key. For example, the seed may be used to generate a key to which an additional offset value is added to generate further keys. In another example, further keys may be generated by running a generation algorithm for multiple time steps with each time step producing a key.

The immutable key data store 102 may be implemented as a matrix. As discussed above, the key data may be considered to provide an addressing mechanism to access the memory 101. As such, the key data store 102 may also be known as an addressing matrix.

In order to speed-up similarity comparisons between a query 104 and key data, the system 100, 200 may further comprise an index of the plurality of keys. The index may be based upon a k-nearest neighbor model or an approximate k-nearest neighbor model. The k-nearest neighbor model may be based upon locality-sensitive hashing or another similarity preserving hash function. The most similar keys to a query may be found by looking-up the k-nearest neighbor model. Given that the key data store 102 is immutable, the k-nearest neighbor model need only be indexed once compared to prior art methods which may index the contents of the memory itself and therefore would require re-generating the index each time the memory is modified.

Figure 3:
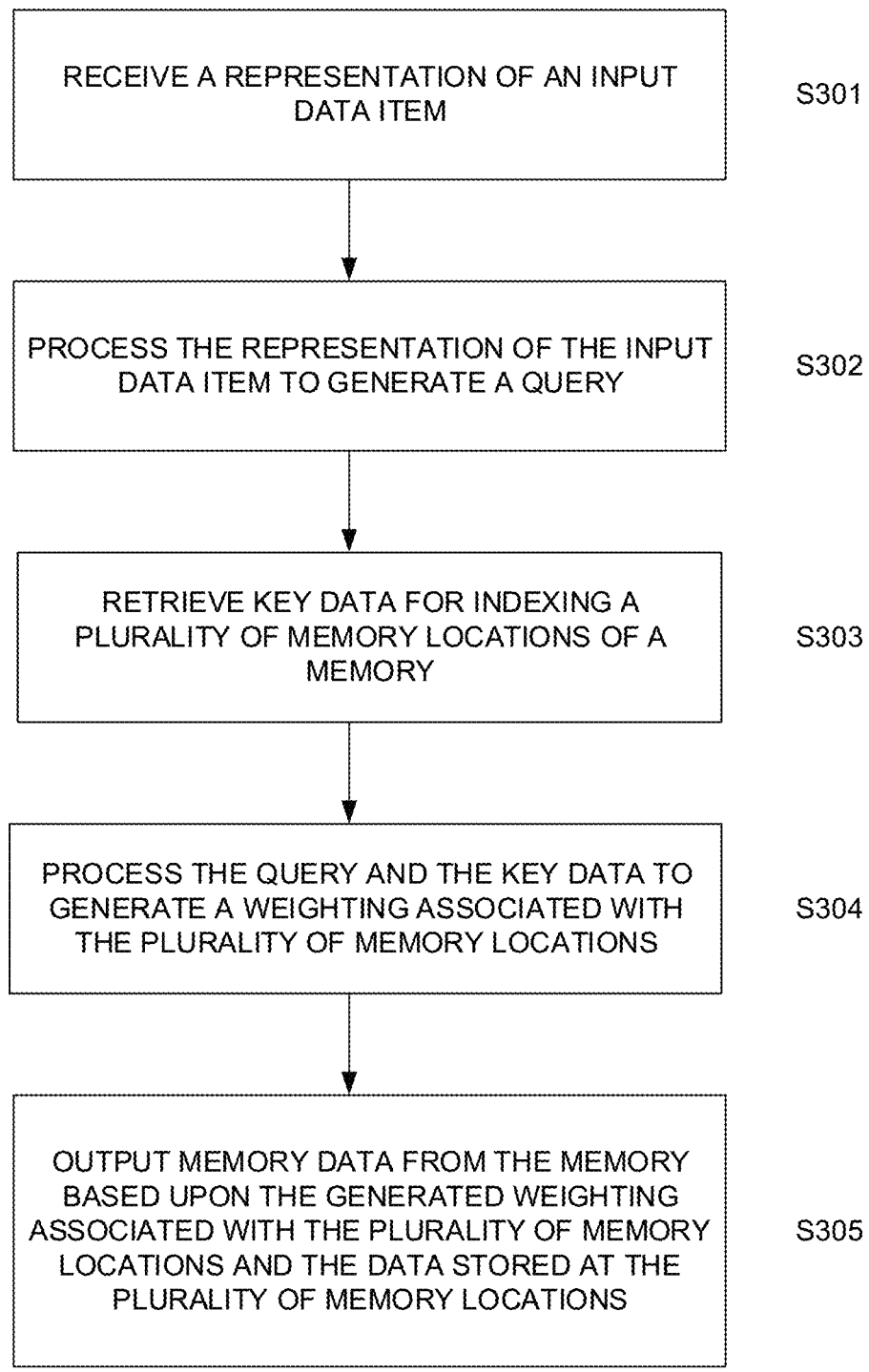
FIG. 3 show exemplary processing for reading data from a neural network memory system.

Referring now to FIG. 3, processing for reading data from a neural network memory system will now be described. It will be appreciated that the processing may be performed using the systems 100, 200 of FIGS. 1 and 2 respectively.

At step S301, a representation 107 of an input data item is received. The representation 107 of the input data item may be generated using an encoding function as shown below:

$$z \leftarrow f_{enc}(x) \quad (1)$$

where z is the representation 107 of the input data item, $f_{enc}(.)$ is the encoding function and x is the input data item. As discussed above, the encoding function may be implemented using an encoder neural network 212.

At step S302, the representation 107 of the input data item is processed by a query neural network 106 to generate a query 104. The query neural network 106 may implement a function mapping a representation 107 to a query 104:

$$q \leftarrow f_q(z) \quad (2)$$

where q is the query 104, $f_q(.)$ is the mapping function and z is the representation 107 of the input data item.

At step S303, key data for indexing a plurality of memory locations $101a \ldots n$ of a memory 101 is retrieved from an immutable key data store 102. The retrieval may be an accessing of the immutable key data store 102 to read the key data stored therein. As discussed above, the immutable key data store 102 may store the seed data used to generate the plurality of keys rather than the plurality of keys themselves. In this case, the retrieval of the key data may further comprise re-generating the plurality of keys using the immutable seed data. The addressing system 103 may be configured to perform this re-generation of the plurality of keys.

At step S304, the query 104 and the key data is processed by the addressing system 103 to generate a weighting 105 associated with the plurality of memory locations $101a \ldots n$. The weighting 105 may be based upon a similarity between the query 104 and each of the plurality of keys. For example, the similarity may be based upon a cosine distance and be implemented as:

$$d \leftarrow q^T A \quad (3)$$

where A is a row matrix containing the plurality of keys, $q^T$ is the query 104 in the form a column vector and d is a vector of similarity scores for each of the plurality of keys. Alternatively, the similarity may be based upon other type of distance such as a Euclidean distance as deemed appropriate.

The weighting 105 may further be based upon a sparse softmax. For example, a sparse softmax function may be applied to the similarity scores din order to produce a probability distribution whereby only a few of the elements have a non-zero value. This may be achieved by ignoring values that are below a threshold or only selecting the top k scoring elements to have a non-zero value. Thus, a weighting 105 may be computed as:

$$a \leftarrow \sigma_k(q^T A) \quad (4)$$

where $\sigma_k(.)$ is a sparse softmax function and $q^T A$ is as described above.

At step S305, output memory data 109 from the memory 101 is output by the memory read system 108 based upon the generated weighting 105 associated with the plurality of memory locations 101a . . . n and the data stored at the plurality of memory locations. This may comprise applying the corresponding weighting 105 associated with a memory location to the data stored at the memory location. For example, the output memory data 109 may be generated as shown below:

$$r \leftarrow M \odot a \quad (5)$$

where r is the output memory data 109, M is a matrix comprising the data stored in the memory, a is the weighting 105 and $\odot$ is an elementwise multiplication.

If the weighting 105 is a sparse weighting, the weighting 105 has an effect of selecting only a few specific memory locations to access based upon the query 104. Alternatively, a threshold may be applied to the weighting 105 such that only the memory locations with associated weightings greater than the threshold are selected or the top k memory locations having the highest corresponding weightings may be selected. By selecting only a few specific memory locations, the system can learn to store data in the memory 101 in a distributed manner and information may be shared between multiple memory locations to increase the informational content of the data stored in the memory 101 whilst also maintaining efficient memory utilization.

If the weighting 105 is based upon a similarity between the key data and the query 104, then the weighting 105 may be considered to be an attention vector for attending to specific locations in the memory 101 and the addressing mechanism may be considered to be a content-based soft-attention mechanism. The addressing mechanism may also be thought of as a differentiable hashing scheme.

The method may further comprise generating an output representation 216 of the input data item 213. The generation may be based upon processing using an output representation neural network 215 the output memory data 109 read from the memory 101 at step S305, received write data 111 and the representation 107 of the input data item received at step S301. For example, the output representation 216 may be generated as shown below:

$$o \leftarrow f_{out}([r; w; z]) \quad (6)$$

where o is the output representation 216, $f_{out}(.)$ is a function implemented by the output representation neural network 215, r is the output memory data 109, w is the received write data 111 and z is the representation 107 of the input data item.

As discussed above, the output representation 216 of the input data item 213 may be dependent on the task being performed and may, for example, be a probability score, or a final output encoding of the input data item 213, or other data characterizing the input data item for use in another system.

The query 104 generated at step S302 may optionally undergo further processing prior to use at step S304. For example, the query 104 may be a vector and may undergo a decorrelation operation to decorrelate the elements of the vector. The decorrelation operation may be any appropriate type of decorrelation such as a sphering or whitening transformation. For example, the decorrelation may be based upon a moving ZCA average as shown below:

$$\mu_{t+1} \leftarrow \gamma\mu_t + (1-\gamma)\bar{s} \qquad \text{First moment (7)}$$

$$\Sigma_{t+1} \leftarrow \gamma\Sigma_t + (1-\gamma)s^T s \qquad \text{Second moment (8)}$$

$$U, s, \_ \leftarrow svd(\Sigma - \mu^2) \qquad \text{Calculate singular values (9)}$$

$$W \leftarrow UU^T/\sqrt{(s)} \qquad \text{Calculate full ZCA matrix (10)}$$

$$\theta_{zca} \leftarrow \eta\theta_{zca} + (1-\eta)W \qquad \text{ZCA moving average (11)}$$

$$q \leftarrow q\theta_{zca} \qquad \text{Decorrelate query (12)}$$

In another example, the decorrelation operation may be based upon PCA. The addressing system 103 may be configured to perform the decorrelation. Decorrelation is particularly beneficial where a sparse and distributed addressing system is desired. Using a decorrelated query encourages the system to maximize the usage of all available memory locations in the memory 101, thereby avoiding selection of only a specific few memory locations for data storage. In addition, a decorrelated query may also result in faster convergence and better optimization during training resulting in a learned data encoding scheme that may be more compressive and hence improves upon memory usage.

Figure 4:
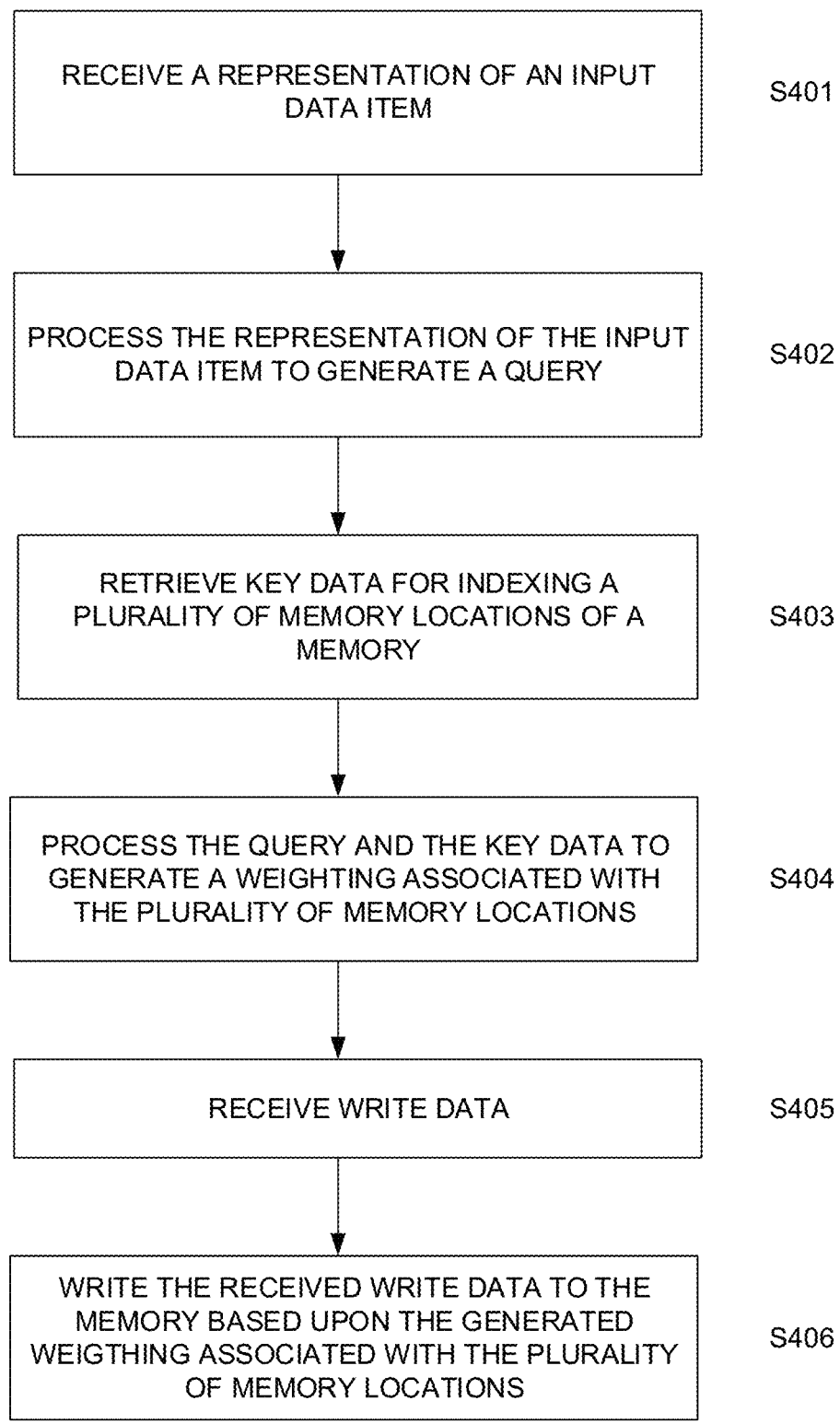
FIG. 4 shows exemplary processing for writing data to a neural network memory system.

Referring now to FIG. 4, processing for writing data to a neural network memory system will now be described. It will be appreciated that the processing may be performed using the systems 100, 200 of FIGS. 1 and 2 respectively.

Steps S401 to S404 of FIG. 4 are identical to steps S301 to S304 of FIG. 3 and therefore the above operations described with respect to steps S301 to S304 also applies to steps S401 to S404. Thus, in brief, at step S401, a representation 107 of an input data item is received; at step S402, the representation 107 of the input data item is processed by a query neural network 106 to generate a query 104; at step S403, key data for indexing a plurality of memory locations 101a . . . n of a memory 101 is retrieved from an immutable key data store 102; and at step S404, the query 104 and the key data is processed by an addressing system 103 to generate a weighting 105 associated with the plurality of memory locations 101a . . . n.

At step S405, write data 111 is received. The write data 111 may be generated using a write word neural network 214 based upon the representation 107 of the input data. For example, the write data 111 may be generated as shown below:

$$w \leftarrow f_w(z) \quad (13)$$

where w is the write data 111, $f_w(.)$ is a function implemented by the write word neural network 214 and z is the representation 107 of the input data item. Alternatively, the write data 111 may be received externally or may simply be the representation 107 of the input data item or the input data item 213 itself without modification.

At step S406, the received write data 111 is written by a memory write system 110 to the memory 101 based upon the generated weighting 105 associated with the plurality of memory locations 101a . . . n. This may be performed by generating weighted write data for each memory location based upon the corresponding weighting 105 associated with the memory location and the received write data 111, and additively writing the weighted write data to each memory location. For example, the write may be performed as shown below:

$$M_{t+1} \leftarrow M_t + wa^T \qquad (14)$$

where $M_{t+1}$ is the memory 101 after writing, $M_t$ is the memory 101 prior to the write, w is the received write data 111 and $a^T$ is the weighting 105. Writing to the memory 101 may therefore be considered as an additive write as new data is added to the existing data in the memory 101. This enables past information to be retained in the memory. It is noted that writing does not require multiplicative gating or squashing as in some prior art neural network memory systems.

The weighting 105 may be generated as described above with reference to FIG. 3. The weighting 105 may be used to select which particular memory locations of the memory 101 to write to and therefore may be considered to be an address. The weighting 105 may specify that all of the plurality of memory locations 101a . . . n are to be written to. Alternatively, the weighting 105 may be sparse and specify a small subset of the memory locations to write to. In this way, data may be stored in a compressed and distributed manner across the memory locations. In addition, where the key data is randomly generated, this in combination with sparse weightings further ensures that the stored data is distributed across the memory to maximize memory utilization rather than only writing data to a few constantly used memory locations. This is in comparison to some prior art neural network memory systems that are either only capable of writing to one memory location in one time step or where multiple memory locations can be written to only very sharp addresses are chosen in practice.

It will be appreciated that whilst the above processing is presented as being carried out in a particular order, it is not intended to limit to any particular ordering of steps and the above steps may be carried out in a different order.

The neural networks of systems 100, 200 of FIGS. 1 and 2 may be trained based upon a meta-learning framework. In a meta-learning framework, training may initially be based upon sample tasks related to the task that the system is to perform before undergoing final training to adapt the system to required task. This is beneficial where there is limited training data available for the required task but other training data may be available. As such, the systems 100, 200 may be trained with limited training data such as in few-shot or one-shot learning settings. For example, it is possible that data is provided as an ephemeral data stream whereby each data item is seen only once and must be learned based observing that single instance.

The systems 100, 200 may implement a bloom filter-like data structure for the task of approximate set membership. Such a system may be trained using a training dataset comprising a distribution of different sets of data with each set of data corresponding to a different set membership task. Upon each iteration of training, one of the sets of data is chosen and the data comprising the set is input to the system 100, 200 for storage as described above. Sample data queries are generated and provided as input to the system 100, 200. For each query, the system provides an output to indicate whether the query data is part of the set of data that was input to the system 100, 200.

The system may then be trained based upon a cross-entropy loss function. For example, the loss function may take the form:

$$L = \sum_{j=1}^{t} y_j \log o_j + (1 - y_j)(1 - \log o_j) \qquad (15)$$

where L is the loss, j is an index over the query data, t is the number of queries, $y_j=1$ if the query data is in the set or 0 if the query data is not in the set, $o_j$ is the output of the system 100, 200 and may be computed as shown in equation (6).

The parameters of the neural networks of the system 100, 200 may then be updated using stochastic gradient descent by computing the gradient of the loss with respect to the parameters of the neural networks and backpropagating through the queries and writes performed. It will be appreciated that the neural network system described above is fully differentiable and is trainable end-to-end.

Further iterations of training may be carried out until suitable stopping criterion is reached, for example, when a maximum number of training iterations is reached. The trained system may then be further trained on the real task data. It is possible that the system may only have one opportunity to observe a particular data item and learn that it is part of the set of data. This is compared to prior art methods which may have unlimited access to the real task data and learns to model the set of data by conventional means of iterating through the entirety of the task data many times until satisfactory performance is obtained before being put to use.

As discussed above, the key data is not learned. The system may be initialized with key data prior to the start of training and remains fixed throughout the training process and in use.

Where the system uses an additive write, backpropagation through time over sequential writes may be avoided. The addition operator is commutative and as such, is invariant to the ordering of writes to the memory and the computation of gradients may be performed in parallel. As such, the system can be trained more efficiently and is scalable whereby prior art neural network systems with memory may fail to train or train poorly if backpropagation through time over very long sequences is required.

The system 100, 200 may be used a replacement for a bloom filter. However, a bloom filter guarantees that no false negatives are generated. That is, given a query data item, if it the query data item is not in the set, the bloom filter is guaranteed not to wrongly output that the query data item is in the set. The system 100, 200 is not able to guarantee that no false negatives are generated and as such, a back-up bloom filter may be used for storing false negatives emitted during training. Table 1 shows a comparison of the space requirements for a database task of storing 5000 row-key strings for a target false positive rate between an exemplary implementation of the system (labeled as "Neural Bloom Filter") and a conventional bloom filter and cuckoo filter.

TABLE 1

| Database task. Storing 5000 row-key strings for a target false positive rate. | | | |
|---|---|---|---|
| | 5% | 1% | 0.1% |
| Neural Bloom Filter | 871 b | 1.5 kb | 24.5 kb |
| Bloom Filter | 31.2 kb | 47.9 kb | 72.2 kb |
| Cuckoo Filter | 33.1 kb | 45.3 kb | 62.6 kb |

Table 1 shows that even when a back-up bloom filter is required, the combined space requirement of the memory 101 of the system and the back-up bloom filter is significantly less than the space requirement of a conventional bloom filter or cuckoo filter for storing the whole data. Thus the system has the capability of learning a more compressive and space-efficient data structure than conventional data structures. The system is capable of learning to exploit the structure in the input data distribution to provide an encoding of data that is significantly more compact than conventional data structures.

The system 100, 200 may be used for static and dynamic set membership tasks. In some prior art neural network systems, set membership is encoded in the weights of one or more neural networks and therefore is not suitable for dynamic set membership tasks given the slow adaptation rate of the weights of a neural. The memory 101 of the system 100, 200 provides the system with the capability to rapidly adapt to new data and is therefore suitable for dynamic set membership tasks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving a representation of an input data item;
   processing, by a query neural network, the representation of the input data item to generate a query;
   generating, from (i) the query and (ii) a respective key for each of a plurality of memory locations of a memory, a respective weight for each of the plurality of memory locations in the memory, wherein the memory stores data representing a set of data items;
   generating output memory data from the memory based on the respective weights for the plurality of memory locations and data stored at the plurality of memory locations; and
   generating, from at least the output memory data, an output that indicates whether or not the input data item belongs to the set of data items.

2. The method of claim 1, further comprising:
   processing the input data item using an encoder neural network to generate the representation of the input data item.

3. The method of claim 1, wherein generating output memory data from the memory based on the respective weights for the plurality of memory locations and data stored at the plurality of memory locations comprises:
   computing, for each memory location, a multiplication between the data stored at the memory location and the respective weight for the memory location.

4. The method of claim 1, wherein generating, from at least the output memory data, an output that indicates whether or not the input data item belongs to the set of data items comprises:
   processing, by an output representation neural network, at least the output memory data to generate the output that indicates whether or not the input data item belongs to the set of data items.

5. The method of claim 4, further comprising:
   processing the representation of the input data item using a write word neural network to generate write data; and wherein
   processing, by an output representation neural network, at least the output memory data to generate an output that indicates whether or not the input data item belongs to the set of data items comprises, processing, by the output representation neural network, at least the write data and the output memory data.

6. The method of claim 5, wherein processing, by an output representation neural network, at least the output memory data to generate an output that indicates whether or not the input data item belongs to the set of data items comprises, processing, by the output representation neural network, the write data, the representation of the input data item and the output memory data.

7. The method of claim 1, wherein generating, from (i) the query and (ii) a respective key for each of a plurality of memory locations of a memory, a respective weight for each of the plurality of memory locations in the memory comprises:
generating, from the query, a decorrelated query; and
generating, from (i) the decorrelated query and (ii) the respective key for each of a plurality of memory locations of a memory, the respective weight for each of the plurality of memory locations in the memory.

8. The method of claim 1, wherein the respective weights are sparse weights that are only non-zero for a proper subset of the memory locations in the memory.

9. The method of claim 1, further comprising:
receiving a first representation of a first data item in the set of data items;
processing, by the query neural network, the first representation of the first data item to generate a first query;
generating, from (i) the first query and (ii) the respective key for each of the plurality of memory locations of a memory, a respective first weight for each of the plurality of memory locations in the memory;
generating, from the first representation of the first data item, write data; and
writing the obtained write data to the memory based on the respective first weights.

10. The method of claim 9, wherein generating, from the first representation of the first data item, write data comprises:
processing the first representation using a write word neural network to generate the write data.

11. The method of claim 9, wherein writing the obtained write data to the memory based on the respective first weights comprises, for each memory location:
adding, to the data stored at the memory location, a product of the write data and the respective first weight for the memory location.

12. A system comprising one or more computers and one or more storage devices storing instructions that when executed by one or more computers cause the one or more computers to perform operations comprising:
receiving a representation of an input data item;
processing, by a query neural network, the representation of the input data item to generate a query;
generating, from (i) the query and (ii) a respective key for each of a plurality of memory locations of a memory, a respective weight for each of the plurality of memory locations in the memory, wherein the memory stores data representing a set of data items;
generating output memory data from the memory based on the respective weights for the plurality of memory locations and data stored at the plurality of memory locations; and
generating, from at least the output memory data, an output that indicates whether or not the input data item belongs to the set of data items.

13. The system of claim 12, the operations further comprising:
processing the input data item using an encoder neural network to generate the representation of the input data item.

14. The system of claim 12, wherein generating output memory data from the memory based on the respective weights for the plurality of memory locations and data stored at the plurality of memory locations comprises:
computing, for each memory location, a multiplication between the data stored at the memory location and the respective weight for the memory location.

15. The system of claim 12, wherein generating, from at least the output memory data, an output that indicates whether or not the input data item belongs to the set of data items comprises:
processing, by an output representation neural network, at least the output memory data to generate the output that indicates whether or not the input data item belongs to the set of data items.

16. The system of claim 15, the operations further comprising:
processing the representation of the input data item using a write word neural network to generate write data; and wherein
processing, by an output representation neural network, at least the output memory data to generate an output that indicates whether or not the input data item belongs to the set of data items comprises, processing, by the output representation neural network, at least the write data and the output memory data.

17. The system of claim 16, wherein processing, by an output representation neural network, at least the output memory data to generate an output that indicates whether or not the input data item belongs to the set of data items comprises, processing, by the output representation neural network, the write data, the representation of the input data item and the output memory data.

18. The system of claim 12, wherein generating, from (i) the query and (ii) a respective key for each of a plurality of memory locations of a memory, a respective weight for each of the plurality of memory locations in the memory comprises:
generating, from the query, a decorrelated query; and
generating, from (i) the decorrelated query and (ii) the respective key for each of a plurality of memory locations of a memory, the respective weight for each of the plurality of memory locations in the memory.

19. The system of claim 12, wherein the respective weights are sparse weights that are only non-zero for a proper subset of the memory locations in the memory.

20. The system of claim 12, the operations further comprising:
receiving a first representation of a first data item in the set of data items;
processing, by the query neural network, the first representation of the first data item to generate a first query;
generating, from (i) the first query and (ii) the respective key for each of the plurality of memory locations of a memory, a respective first weight for each of the plurality of memory locations in the memory;
generating, from the first representation of the first data item, write data; and
writing the obtained write data to the memory based on the respective first weights.

21. The system of claim 20, wherein generating, from the first representation of the first data item, write data comprises:
processing the first representation using a write word neural network to generate the write data.

22. The system of claim 20, wherein writing the obtained write data to the memory based on the respective first weights comprises, for each memory location:
adding, to the data stored at the memory location, a product of the write data and the respective first weight for the memory location.

23. One or more non-transitory computer-readable storage media storing instructions that when executed by one or more computers cause the one or more computers to perform operations comprising:
    receiving a representation of an input data item;
    processing, by a query neural network, the representation of the input data item to generate a query;
    generating, from (i) the query and (ii) a respective key for each of a plurality of memory locations of a memory, a respective weight for each of the plurality of memory locations in the memory, wherein the memory stores data representing a set of data items;
    generating output memory data from the memory based on the respective weights for the plurality of memory locations and data stored at the plurality of memory locations; and
    generating, from at least the output memory data, an output that indicates whether or not the input data item belongs to the set of data items.

* * * * *